United States Patent Office 3,488,499
Patented Jan. 6, 1970

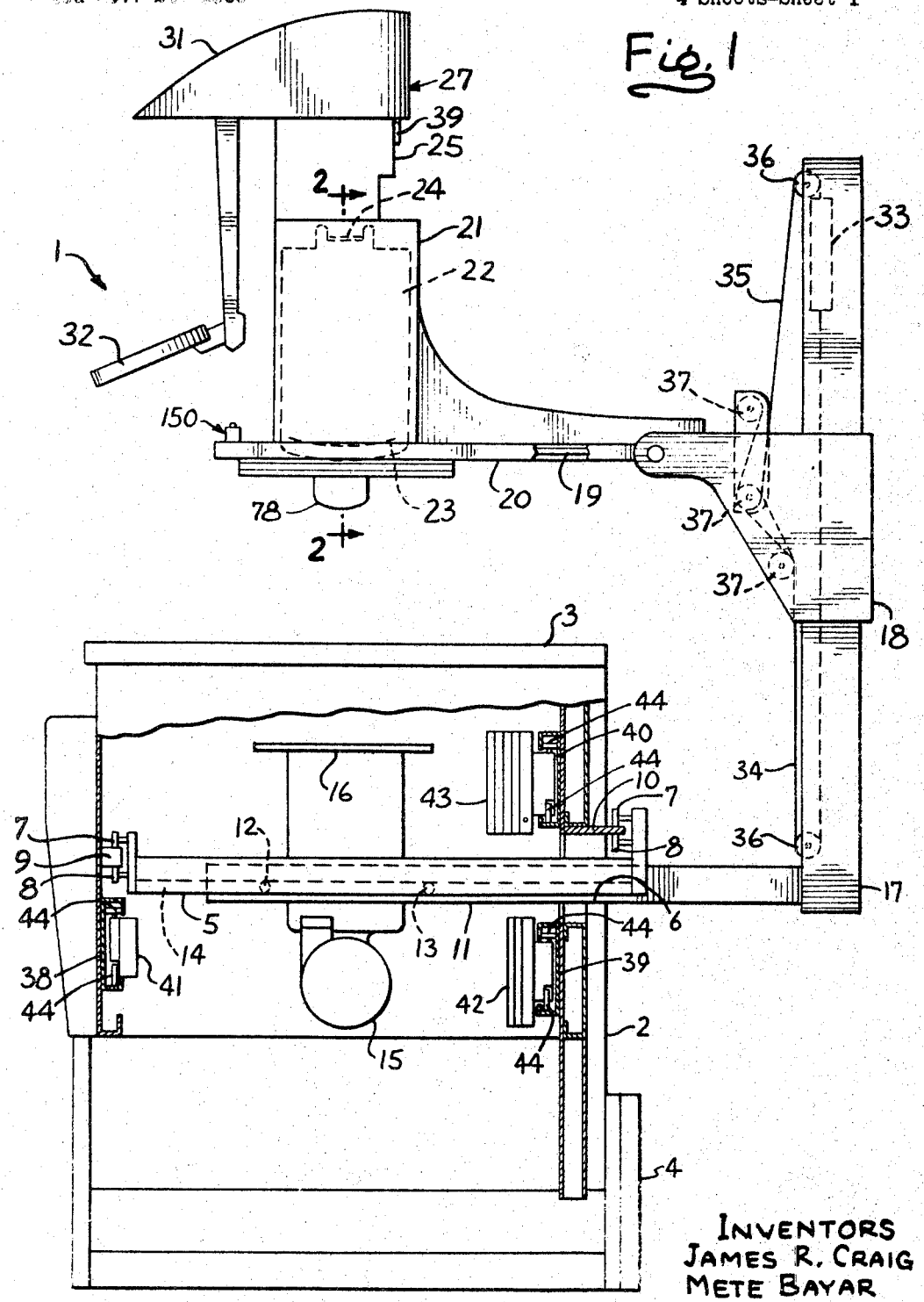

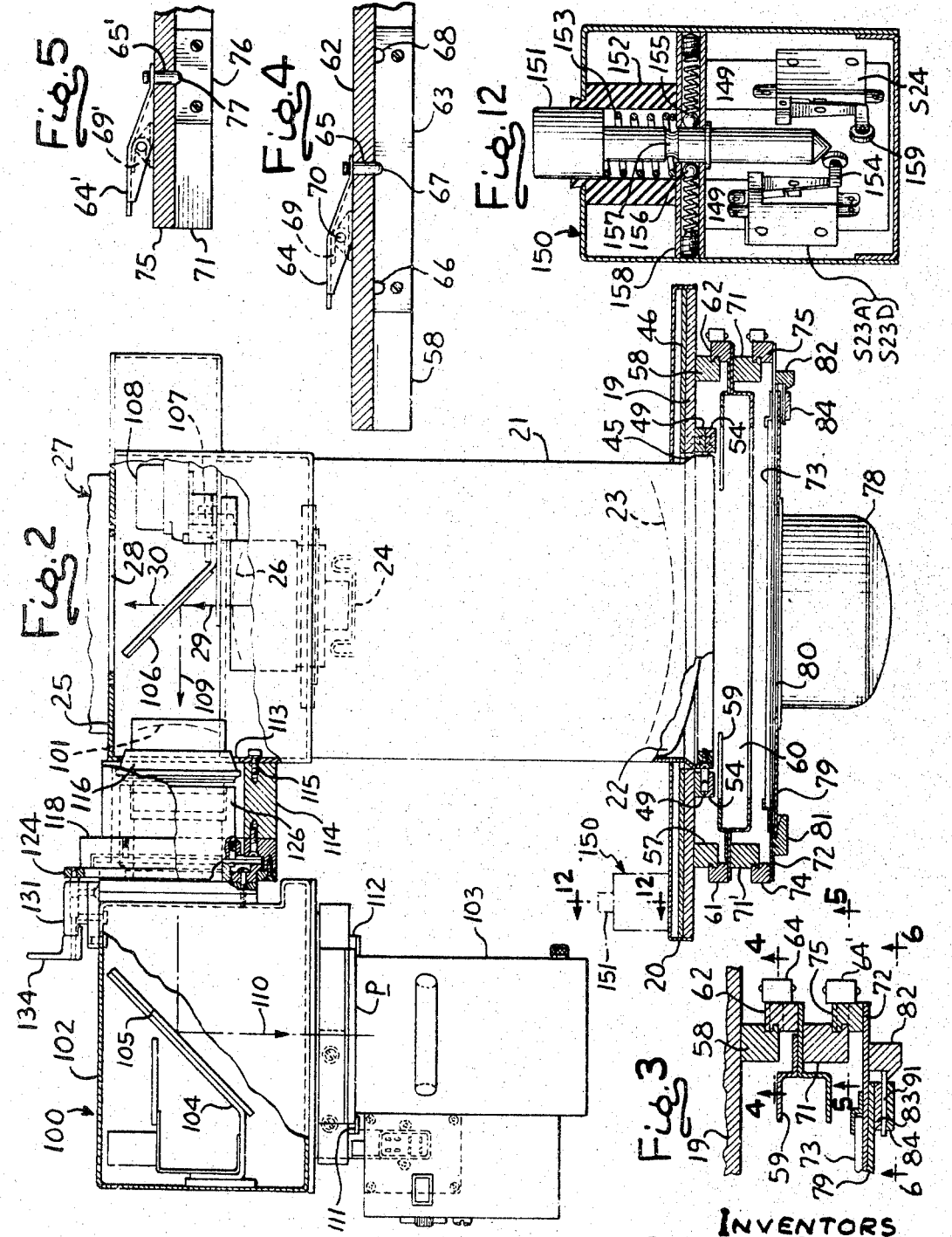

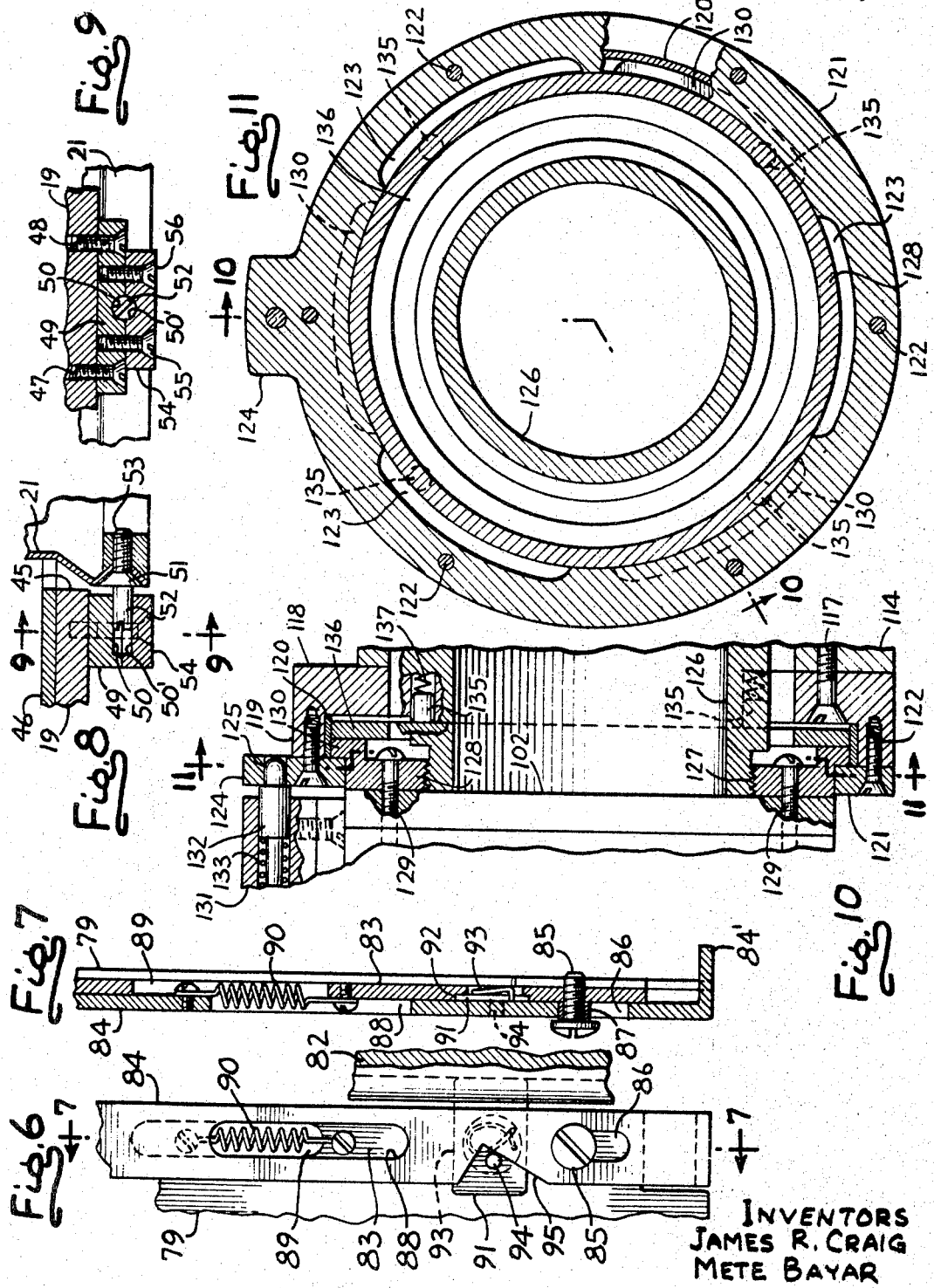

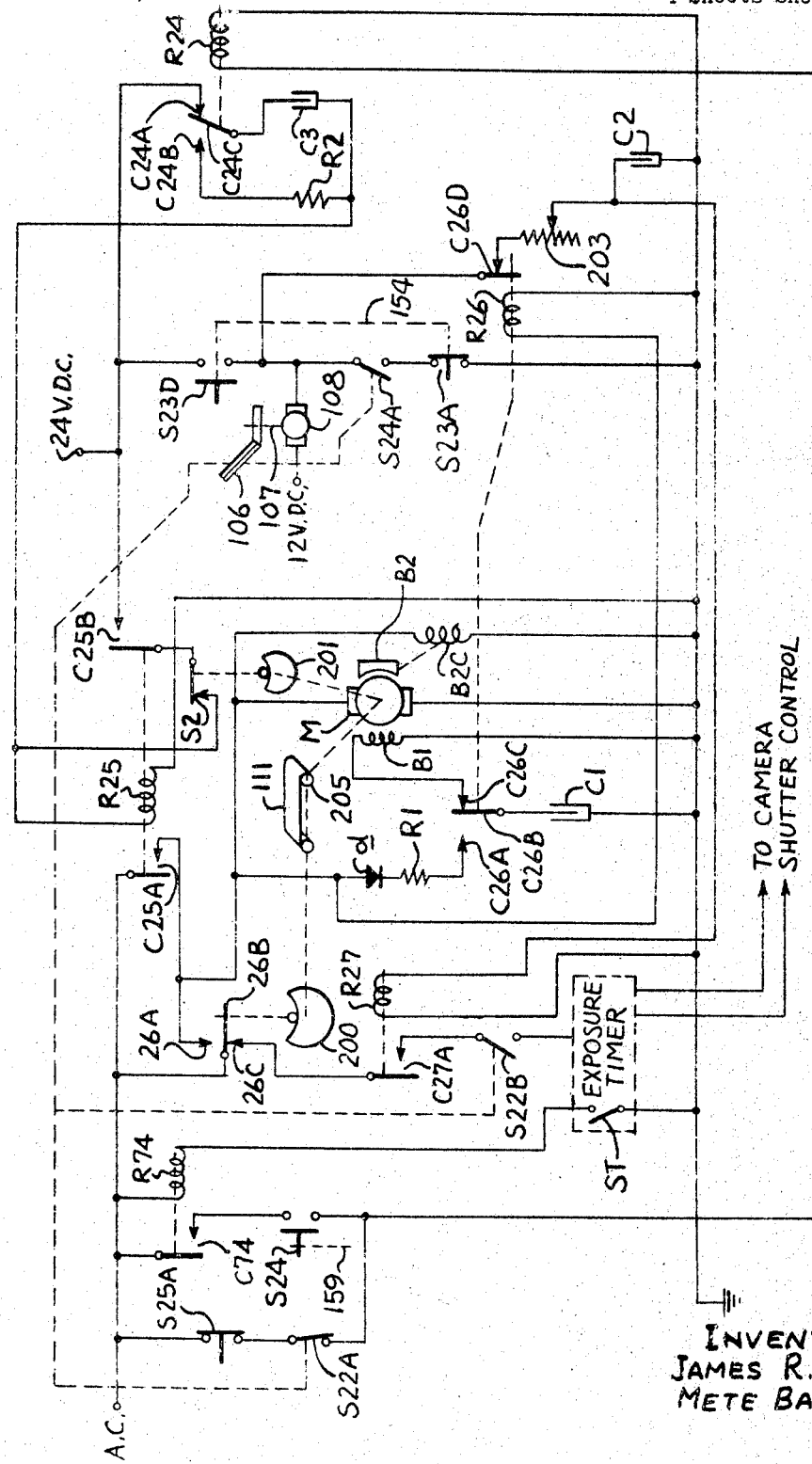

---

3,488,499
DIRECT CONTACT X-RAY IMAGE INTENSIFIER HOUSING APPARATUS
James R. Craig, Glenview, and Mete Bayar, Elmhurst, Ill., assignors to Profexray, Inc., Maywood, Ill.
Filed Nov. 24, 1965, Ser. No. 509,546
Int. Cl. H01j 1/62
U.S. Cl. 250—77                                                           5 Claims

ABSTRACT OF THE DISCLOSURE

An improved X-ray apparaus for diagnosis of a patient wherein the film cassette holder may be removed in order that the end of an image intensifier housing can be placed in direct contact with the body of the patient. Furthermore, indexing means for selectively positioning the film cassette holder in one of a plurality of positions beneath the image intensifier housing is provided.

---

This invention relates to medical diagnositic X-ray apparatus, and more particularly to improvements in apparatus for photographing the image on the output screen of an image intensifier.

In order to reduce the dosage of radiation to which a patient is subjected, image intensifiers have found an increasing and widespread use in recent years. In using these intensifiers, the image on the output screen is suitably magnified and observed through a viewing system. For certain diagnositic procedures, however, it may be desirable to photograph the image not only as a record for future reference but also to enable the radiologist to give more careful review to the case. Accordingly, a camera, such as a motion picture camera, has been mounted adjacent to the intensifier and in such position as to photograph all or part of the image being viewed. In general, the larger the film size, the better the definition or picture quality but the slower the rate of film advance in the film magazine, and conversely, the smaller the film size, the faster the rate of film advance, but with a sacrifice in picture quality. Some procedures are best photographed at high speed with a smaller size of film, while others do not require high speed but increased picture quality. Thus, a single camera is far from the optimum if the X-ray equipment is to be most effectively utilized.

It is an object of the present invention to provide an X-ray apparatus of the type stated in which the camera may be quickly detached from its mounting so that it may be interchanged with another camera, for instance one having a magazine carrying a different size of film, thus enabling the radiologist to utilize a selected camera for the particular diagnostic procedure to be carried out without excessive time being consumed in "setting up" the equipment.

It is a further object of the present invention to provide apparatus of the type stated in which the camera may be operated to produce signal or serial exposures. In the preferred form of the invention, a single switch actuator is used and has one position for single exposures and another position for serial exposures. Either position may be selected at any time during the fluoroscopy. Where single exposures are taken, the film is advanced automatically one frame after the exposure preparatory to taking another exposure.

It is also an object of the present invention to provide apparatus of the type stated in which the intensifier housing is mounted on a carriage or support plate so as to position the input screen of the intensifier closer to the patient than has been heretofore possible when the intensifier has been mounted on top of a spot film device. In accordance with this object of the invention, the spot film device is eliminated, and a plate, which is much thinner than the spot film device housing, is used to support the intensifier. The intensifier housing may be clamped to the support plate so as to project therethrough.

The attainment of the above and further objects of the present invention will be apparent from the following detailed description taken in conjunction with the accompanying drawing forming a part thereof.

In the drawing:

FIG. 1 is a side elevational view, partly in section, of an X-ray constructed in accordance with and embodying the present invention;

FIG. 2 is a fragmentary sectional view taken along line 2—2 of FIG. 1;

FIG. 3 is a fragmentary sectional view, on an enlarged scale, of a portion of FIG. 2 at the lower right-hand corner thereof;

FIGS. 4, 5 and 6 are fragmentary sectional views taken approximately along lines 4—4, 5—5 and 6—6, respectively, of FIG. 3;

FIG. 7 is a fragmentary sectional view taken along line 7—7 of FIG. 6;

FIG. 8 is a fragmentary sectional view, on an enlarged scale, of a portion of FIG. 2 and showing the arrangement for mounting the intensifier housing to the carriage plate;

FIG. 9 is a fragmentary sectional view taken along line 9—9 of FIG. 8;

FIG. 10 is a fragmentary sectional view taken along line 10—10 of FIG. 11 and showing the arrangement for detachable mounting of the camera;

FIG. 11 is a fragmentary sectional view taken along line 11—11 of FIG. 10;

FIG. 12 is a fragmentary sectional view taken along line 12—12 of FIG. 2; and

FIG. 13 is a circuit diagram showing the exposure and film-advance control that forms part of the present invention.

Referring now in more detail and by reference characters to the drawing. 1 designates an X-ray apparatus comprising a table 2 supported in a known manner on a base 4 and having a top 3. Mounted within the table 2 is a carrier 5 that projects outwardly through a slot 6 in the table 2. The carrier 5 may have rollers 7, 8 that move along trackways or guides 9, 10 on the table 2. The carrier 5 supports a tube carriage 11 having rollers 12, 13 that ride in transversely extending trackways 14 on the carrier 5. A fluoroscopic X-ray tube 15 is mounted on the carriage 11 as well as a conventional shutter assembly 16 for the tube 15.

The carriage 11 is in rigid connection with a tower 17 upon which a tower carriage 18 is mounted for sliding movement upwardly and downwardly therealong, the tower carriage including a carriage plate 19 and a cover 20 therefor, both of which overlie the table top 3. An image intensifier housing 21 is mounted on the carriage plate 19 and contains an image intensifier tube 22 of known design. This device conventionally includes an input screen 23 that receives X-rays from the tube 15 and an output screen 24 upon which a reduced size replica of the image on the input screen appears, but which has been intensified or brightened several thousand times.

A light-distributor housing 25 is rigidly mounted on top of the intensifier housing and contains a suitably housed objective lens 26 (FIG. 2) by which the image on the output screen 24 may be magnified. A viewing system 27 may be mounted on top of the distributor 25 over a top opening 28 therein so that light may pass in the direction of the arrows 29, 30 and through the opening 28 to the viewing system 27, allowing the magnified image of the output screen to be viewed. The viewing system 27 is of a known type and need not be described in detail. Suffice it to say, however, that it includes a hood 31 that contains mirrors so that the image may be viewed by the radiologist at a viewing mirror 32.

The tower 17 and carriage 18, along with the intensifier 22 and other parts carried by the carriage 18, will move transversely of the table 2 jointly with the tube carriage 11, and through the carrier 5, will also move longitudinally of the table so that the input screen 23 will at all times during fluoroscopy be in a proper position to receive X-rays from the X-ray tube 15. Furthermore, the slidable connection of the carriage 18 with the tower 17 enables the intensifier 22 to be moved toward and away from the table top 3. A counterweight system is provided for the carriage 18 and parts carried thereby. This includes a counterweight 33 that is movable upwardly and downwardly within the tower 17. Cables 34, 35 join the counterweight to the carriage 18 and these cables may be trained around pulleys 36, 37 in a suitable manner, the pulleys 36, 37 being mounted on the tower 17 and on the carriage 18.

A drive mechanism (not shown) may be embodied in or coupled to the table 2 for purposes of rotating the table 2 about an axis passing at right angles to the length thereof so that the table may be tilted in either direction to various positions in which one transverse end of the table is lower than the other. This is conventional in diagnostic X-ray tables. Accordingly, a counterweighting system must be provided for the tower 17 and apparatus carried thereby (i.e. carriage 18, intensifier, etc.) when the table is tilted. In the present invention all of the counterweights for this purpose are mounted within the table 2. Channels or trackways 38, 39, 40 are mounted within the table 2 and extend longitudinally thereof and support counterweights 41, 42, 43 which ride in their respective trackways on rollers 44. Cables may be used to connect the counterweights 41, 42, 43 to the carrier 14 and those cables may be trained around pulleys at the opposite ends of the table. A system of this type is now known in the art and is illustrated in the copending application of Craig and Otto Jr., Ser. No. 376,178, filed June 18, 1964, now Patent No. 3,325,643, and to which reference may be had.

Referring now to FIGS. 2, 8 and 9, it will be seen that the intensifier housing 21 projects through an opening 45 in the carriage plate 19 and also through a similar opening in a lead shielding plate 46. Secured to the underside of the carriage plate 19 by screws 47, 48 is a series of blocks 49. By way of example there may be four such blocks 49 ninety degrees apart, one being shown enlarged in FIGS. 8 and 9. Each block 49 has a downwardly opening recess 50 that receives a screw 51 having threaded and unthreaded shank portions 52, 53 and a head therebetween. This screw 51 is threaded into an annular mounting ring 54 at the bottom of the intensifier housing 21 with the head of the screw 51 abutting a countersink in the housing 21 and with the unthreaded shank 52 in the recess 50. A clamp 54 is secured to the block 49 by screws 55, 56, and the clamp 54 has a companion recess 50' that cooperates with the recess 50 to receive the shank portion 52 so that the screw 51 is clamped between the block 49 and clamp 54.

Secured to the underside of the carriage plate 19 are parallel guide rails 57, 58 which constitute a trackway for mounting a cassette frame 59, the latter having a cavity 60 into which a film cassette may be inserted whereby a radiograph may be obtained. The cassette frame 59 has parallel side bars 61, 62 that interfit with and slide along the rails 58, 59. Referring to FIG. 4, it will be seen that at the bottom of one rail 58 there is an indexing plate 63 secured thereto and adjacent to one end thereof. An indexing lever 64 is rockably pinned at 70 on the side bar 62 and has an indexing plunger 65 at one end thereof that slidably projects through the side bar 62 for selective engagement with any one of three notches 66, 67, 68 in the indexing plate 63. A suitable hairpin type of spring 69 may be wrapped about the pivot pin 70 for the lever 64 and used to maintain the indexing plunger 65 in its indexed position. Thus, the cassette frame 59 may be indexed at any one of three positions. When indexed at the center notch 67, as shown, the cassette in the frame will be at the full exposure position and when in either notch 66 or 68 the cassette will be positioned to expose one-half of the film therein. Also, when the plunger 65 is retracted, the entire cassette frame 59 may be withdrawn from the rails 57, 58.

Secured to the underside of the cassette frame 59 at the margins thereof are depending rails 71, 71' for supporting a grid-mounting plate 72 that receives a conventional grid 73 that is used in conjunction with the film in the cassette for making the radiograph. Like the cassette frame 59, the grid-mounting plate 72 has side bars 74, 75 that interfit with an slide along the rails 71, 71'. As seen in FIG. 5, an index strip 76 is secured to the underside of the rail 71 and has a single indexing notch 77. An index lever 64' identical to lever 64 and biased by hairpin spring 69', carries an index plunger 65' that slidably projects through the side bar 75 and engages the notch 77. This retains the plate 72 and the grid 73 in proper position. Depression of the lever 64' retracts the plunger 65' and allows the plate 72 to be slid along the rails 70, 71 to remove the plate 72 from the remainder of the apparatus.

Also carried by the plate 72 is an inverted, dome-shaped, plastic palpation device 78 which is sometimes used during fluoroscopy. Since the device 78 is not always used, means are provided for its ready removal. The device 78 is secured to and depends from a plate 79 that has a central opening 80 of approximately the diameter of the device 78. At one side of the grid-support plate 72 is a side bar 81 that receives one edge of the plate 79. The other or right hand edge of the grid-support plate 72 (FIGS. 2 and 3) has another side bar 82.

A latching arrangement, shown best in FIGS. 3, 6 and 7 provides a quick release and attachment for the plate 79. To this end a latch bar 83 is secured to the underside of the plate 79 at the edge thereof that is adjacent to the side bar 82. A latch strip 84 lies below the latch bar 83 and a screw 85 passes through an elongated guide slot 86 in the latch strip 84 and is threaded into the latch bar 83. A bushing 87 surrounds the screw 85. The bar 83 and strip 84 also have elongated slots 88, 89 which provide clearance for a tension spring 90, the opposite ends of which are secured by the screws shown to the bar 83 and strip 84, respectively. A latch 91 lies between the bar 83 and strip 84 and slidably fits in a recess 92 in the bar 83. A coil spring 93 is secured at one end to the latch 91 and at its other end to latch bar to bias the latch 91 to the right (FIG. 6) and hence into latching engagement with the side bar 82. Also, the latch 91 has a depending pin 94 which engages a beveled cam edge 95 on the strip 84. When the latch strip 84 is shifted, as by pushing against its upturned end 84', against the opposition of spring 90, the cam edge 95 causes the latch 91 to shift to the left (FIGS. 3 and 6) and retract the latch 91 inwardly of the inner edge of the side bar 82. This allows the right hand end (FIG. 2) of the plate 79 to drop downwardly to clear the side bar 82, whereupon the left hand end of the plate 79 may be withdrawn from the side bar 81. The plate 79 is attached in place in reverse order. While one latch 91 is shown adjacent to one end of the latch bar and strips 83, 84, it will be understood that an identical latch 91 with associated spring 93 as well as an additional cam edge 95, bushing 87, screw 85 and slot 86, will be provided adjacent to the other end of the bar and strip 83, 84.

Turning again to FIG. 2 it will be seen that a camera 100 is removably mounted on the housing 25 for the purpose of photographing, during fluoroscopy, the image on the output screen 24, as magnified by the objective 26. The camera includes a lens 101 (or lens system), a camera housing 102, and a film magazine 103. Within the camera housing 102 and secured thereto by a bracket 104 is a mirror 105. The distributor-housing 25 also has a mirror 106 that is rotated by the output shaft 107 of a motor 108. This mirror 106 is of a type that reflects some of the light impinging thereon and also allows a portion of the light to pass therethrough. Normally the mirror 106 is not in the position shown in FIG. 2 but is in a position wherein it does not obstruct the opening 28 so that all of the light coming from the output screen 24 is directed to the viewer 27. However, as will be hereinafter more fully described, the motor 108 is used to rotate the mirror 106 to the position shown in FIG. 2 in which some of the light will pass in the direction of the arrow 30 and some will be reflected in the direction of the arrow 109 toward the lens 101. The light passing through the camera lens 101 is then reflected as indicated by arrow 110 to the film 111 (FIG. 13) which lies in a film plane *p*. Furthermore, the film magazine 103 may be attached to the housing 102 at slides 111, 112 so that the film magazine 103 (or similar film magazine with a different size of film) may be removed and replaced.

As seen in FIGS. 2, 10 and 11, an arrangement for quickly detaching the camera 100 from the housing 25 is provided so that another camera with like mounting mechanism may be mounted on the housing. Such other camera (or cameras) may have a lens with a different focal length as well as a magazine with film of different size and a different speed of film advance. The housing 25 has a lateral opening 113 at which a hollow cylindrical mounting block 114 is secured as by circumferentially disposed screws 115, one of which is shown in FIG. 2. The lens housing 116 projects through the block 114 and opening 113. Secured to one end of the block 114 as by screws 117 is a ring 118 having an axial flange 119 that surrounds a thin ring 120. A bayonet plate 121 is secured as by screws 122 to the axial face of the flange 119. This plate 121 has a series of circumferentially spaced bayonet slots 123, and in addition has a radial flange 124 with an indexing hole 125, for purposes presently more fully appearing.

The lens housing 116 includes a sleeve 126 that lies within the ring 118 and is axially threaded as at 127 into a bayonet ring 128, the latter in turn, being secured as by screws 129 to adjacent part of the camera housing 102. Formed on the periphery of the bayonet ring 128 are bayonet lugs 130 which are sized to fit into the bayonet slots 123 when the bayonet ring 128 is moved axially through the bayonet plate 121, after which the bayonet ring 128 may be rotated until the lugs 130 are offset from the bayonet plate 121.

A block 131 is screwed to the top of the camera housing 102 and has a plunger 132 axially slidable therein and biased by a compression spring 133 to the right (FIGS. 2 and 10). A handle 134 is secured to the plunger shaft, and when the bayonet lugs 130 are inserted through the slots 123 the bayonet plate 121 together with the camera 100 may be rotated until the head of the plunger 132 abuts the flange 124 causing the plunger 132 to be depressed to the right. As the plunger 132 becomes aligned with the hole 125 the plunger 132 snaps into the hole 125 to prevent rotation of the camera relative to the housing 25 when the camera is in its mounted position.

Mounted within the ring 118 are circumferentially spaced pins 135 which are biased by springs 137 toward a pressure ring 136, the latter in turn applying pressure against the bayonet ring 128. Thus, when the bayonet lugs 130 are passed through the bayonet slots 123 and rotated past the bayonet slots 123, pressure will be imposed on the bayonet ring 128 by the pressure ring 136 in the direction toward the bayonet plate 121 and facilitate firm connection between the camera 100 and the housing 25. The camera is readily removed by pulling on the handle 134 to retract the plunger 132 from the hole 125 so that the camera may be rotated until the lugs 130 are aligned with the slots 123, whereupon the camera may be axially withdrawn from the housing 25.

From the foregoing it will be seen that the camera 100 may be readiy detached from the housing 25 by pulling on the punger handle 134, then rotating the camera until the bayonet lugs 130 are in alignment with the bayonet slots 123, whereupon the entire camera may be axially retracted from the housing 25. Another camera with like mounting arrangement (i.e. bayonet ring 128, plunger 132, etc.), may be mounted onto the housing 25 in the previously described manner.

FIG. 13 shows a diagram of circuits by which the camera 100 may be operated selectively to make a single exposure and advance the film or to make serial exposures, all under the control of a single pushbutton actuator assembly 150, shown in FIG. 12, which is mounted on the carriage cover 20 or at any other suitable location. This actuator includes a housing having pushbutton 151, slidable in a guide 152, and a return spring 153 for the pushbutton. The pushbutton 151 is adapted to depress an actuator arm 154 for closing normally open switch S23D and at the same time opening normally closed S23A, both of which are suitably mounted within the housing as by a bracket 149. The switches S23A, S23D will be operated when the pushbutton 151 is depressed until spring pressed balls 155, 156 engage a detent 157 in the pushbutton 151 shaft. This forms a light but noticeable grip on the pushbutton 151 and assists the user in maintaining the pushbutton 151 depressed far enough for positive operation of the switches S23A, S23D, but not far enough to operate the actuator 159 for the switch S24.

Assume that the film 111 is in position ready for exposure. Depression of the pushbutton 151 operates the switches S23A, S23D but does not operate switch S24. This causes switch S23D to close and switch S23A to open. This completes a circuit from 24 volts D.C. through the mirror motor 108 to 12 volts D.C. and causes the mirror 106 to rotate to the position of FIG. 2. The rotatable mirror assembly is, as shown in FIG. 13, in mechanical connection with switches S24A, S22B and S22A so that rotation of the mirror to photo-taking position will close switches S24A, S22B and open switch S22A. A circuit is established from the 24 volts D.C., through switch S23D, a normally closed pair of relay contacts C26D, and variable potentiometer 203 to relay coil R27. Capacitor C2 is also charged and cooperates with the potentiometer 203 to form a time delay circuit for energizing the coil R27 when the mirror 106 is in its photo-taking position. Energizing coil R27 closes the normally open relay contact pair C27A. This sends a signal from the A.C. line through normally closed contacts 26B, 26C of a single pole double throw switch in the film magazine and also through closed contact pair C27A and closed switch S22B to an exposure timer, which controls the operation of the camera shutter to make the exposure.

When pushbutton 151 is released switch S23A is closed, and switch S23D is opened. Closing switch S23A establishes a circuit from 12 volts D.C. through switches S23A, S24A to ground, thereby reversing the polarity of the motor 108 and causing it to rotate in the opposite direction to move the mirror 106 to its normal or parked position. As the mirror 106 reaches that position switch S24A will be opened by actuation from the mirror assembly.

Movement of the mirror 106 to its parked position will also open switch S22B and close switch 22A. Closing switch 22A energizes coil R24 from the A.C. line, causing contacts C24A and C24C to close and normally closed contacts C24B and C24C to open. This establishes a circuit from 24 volts D.C. through capacitor C3 and relay coil R25. The displacement current in that circuit momentarily energizes coil R25 closing relay contact pair C25B to establish a holding circuit from 24 volts D.C. through the coil R25.

The energized coil R25 closes the relay contact pair C25A, establishing a circuit from the A.C. line through the film advance motor M, that is in the film magazine and is in driving connection with the film spool mechanism 205. At the same time a magnetic brake coil B2C is energized which releases a normally engaged spring loaded brake B2 for the motor M. Another circuit is established from the A.C. line through relay contact pair C25A through relay coil R26 to open the contact pair C26D, close the contacts C26A, C26B, and open contacts C26B, C26C. This establishes a circuit from the A.C. line through diode d, resistor r1 and capacitor C1 to charge the latter.

The motor M is in driving engagement with cams 200, 201 within the film magazine. As the motor M rotates to advance the film 111 one frame the rotation of cam 201 actuates a switch S2 which is thereby opened to break the holding circuit of the coil R25 and open contact pairs C25A and C25B. In the meantime rotation of cam 200 actuates switch contact 26B to open contacts 26B, 26C and close contacts 26A, 26B, thereby maintaining the circuits from the A.C. line to the motor M, capacitor C1 and relay coil R26. When the film has advanced one frame the cams 200, 201 are in their normal position. This opens contact 26A, 26B and recloses contacts 26B, 26C. When the contacts 26A, 26B are opened the circuit to coil R26 is broken causing contacts C26B and C26C to close. Brake coil B2C is deenergized to engage brake B2. Also, the capacitor C1 discharges through a dynamic braking coil B1 which serves as an auxiliary brake for the motor M. This dynamic brake is optional and may, in some instances, be eliminated for small film sizes where the inertia of the system is low and mechanical braking is adequate.

The next time the pushbutton 151 is depressed to actuate switches S23D, S23A and the mirror 106 is moved to photo position, the switch S22A will open closing contacts C24B, C24C to discharge the capacitor C3 through the resistor r2 so that when the mirror is returned to parked position the capacitor C3 may again be charged to energize relay R25 to set the film advance circuits, as aforesaid, into operation.

The film 111 may, if desired, be advanced without taking an exposure. For this purpose a pushbutton operated auxiliary switch S25A may be provided and physically located in any convenient place. This switch S25A is normally closed and may be opened and closed by its pushbutton. Opening switch S25A and then closing the same momentarily deenergizes coil R24 allowing contacts C24B and C24C to close and discharge the capacitor C3. When switch S25A is reclosed the circuit from 24 volts D.C. across capacitor C3 is established to energize the coil R25 momentarily and set the remaining film advance circuits into operation.

For serial photography the pushbutton 151 is depressed downwardly far enough so that the switch S24, as well as switches S23A, S23D, is actuated. Closing normally open switch S24 provides a circuit to the relay coil R24 which is opened and closed by a pair of normally open contacts C74 that are closed by a relay coil R74. The coil R74 is connected to the exposure timer and is controlled thereby in a conventional manner as by a suitable switch ST in the timer that always momentarily opens and closes at the end of the exposure. The switch ST may be a relay actuated by signal from the timer. This will cause the relay coil R74 to be momentarily energized and then deenergized after completion of the exposure. Therefore, at the end of each exposure the capacitor C3 will be discharged through r2 and then recharged to energize the coil 25 to commence the film advance cycle, repeating the exposure and film advance as long as the pushbutton 151 is depressed to keep switch S24 closed.

It will be apparent to those skilled in the art that the parts within the film magazine may be electrically connected to the parts exterior thereof in any desired manner as by plug-in cable connectors so as to facilitate removal of the film magazine from the housing of the camera and attachment of a similar film with a different size of film.

For instance, a 90 mm. film magazine capable of taking, for example, one frame per second may be interchanged with a 70 mm. film magazine capable of taking, for example, four frames per second.

In compliance with the requirements of the patent statutes, I have herein shown and described a preferred embodiment of the present invention. It is, however, to be understood that the invention is not limited to the precise construction herein shown, the same being merely illustrative of the principles of the invention. What is new and considered to be secured by Letters Patent is:

1. X-ray apparatus for diagnosis of a patient comprising: a table; an X-ray tube located below the top of said table; an image intensifier tube located above the top of said table; a housing for said image intensifier tube; housing support means for mounting said image intensifier in position so that X-rays emitted from said X-ray tube are received by said image intensifier, and for positioning said image intensifier housing in direct contact with said patient, said housing support means including support plate means having an opening surrounding said intensifier housing, said plate means being located about a lower end of said housing; means connected to said plate means spaced about said opening for fastening said plate means and said housing together; track means carried on the underside of said plate means and spaced from said opening for supporting a cassette film holder; and a cassette film holder, said cassette film holder having means for slideably engaging said track means whereby said cassette holder is removably supported from said plate in a position beneath said image intensifier so that when said cassette holder is removed, there is no appreciable space between said image intensifier and the patient.

2. The invention as defined in claim 1 further comprising: second track means carried on the underside of said cassette film holder and spaced from said opening for supporting a grid; a grid having means for slideably engaging said second track means on said cassette film holder whereby said grid is removably supported beneath said cassette film holder.

3. An X-ray apparatus for diagnosis of a patient comprising: a table; an X-ray tube located below the top of said table; an image intensifier located above the top of said table; a housing for said image intensifier; housing support means for mounting said image intensifier in position so that X-rays emitted from said X-ray tube are received by said image intensifier, and for positioning said image intensifier housing in direct contact with said patient, said housing support means including a support plate means having an opening surrounding said intensifier housing; said plate means being located about a lower end of said housing; fastening means spaced about said opening for fastening said plate means and said housing together; and track means carried on the underside of said plate means and spaced from said opening for removably supporting a cassette film holder so that when said cassette film holder is removed, there is no appreciable space between said image intensifier and the patient.

4. X-ray apparatus for diagnosis of a patient comprising: a table; an X-ray tube below the top of said table; an image intensifier tube about the top of said table; a housing for said image intensifier tube; mounting means for supporting said intensifier tube and X-ray tube in positions such that X-rays emitted from said X-ray tube are received by said intensifier tube, and for positioning said image intensifier housing in direct contact with said patient, said mounting means including a carriage having a plate that overlies the top of said table, said plate having an opening through which said intensifier housing protrudes, wherein the lower end of said intensifier housing is below the adjacent part of said plate; fastening means located about said opening for securing said intensifier housing to said plate; and track means spaced from said opening connected to the underside of said plate for removably receiving and supporting a cassette frame so that when said cassette frame is removed, there is no appreciable space between said image intensifier tube and the patient, said track means slideably receiving a cassette frame for movement at right angles to the central axis of said intensifier tube housing.

5. The invention as defined in claim 4 further comprising: a cassette frame slideably engaging said track means for carrying a film to selected positions above said X-ray tube and beneath said image intensifier tube; and indexing means for selectively positioning said cassette frame in any one of a plurality of positions beneath said intensifier tube, said cassette frame further including track means for removably receiving and supporting a grid; said track means slideably receiving said grid for movement at right angles to the central axis of the intensifier housing; and a grid for insertion into said track means wherein said grid is slideably moved to a position beneath said image intensifier.

References Cited

UNITED STATES PATENTS

| | | | |
|---|---|---|---|
| 3,121,167 | 2/1964 | Latson | 250—58 X |
| 3,222,518 | 12/1965 | Nagel | 250—58 |
| 3,325,643 | 6/1967 | Craig et al. | 250—57 |
| 2,575,295 | 11/1951 | Renner | 250—66 |
| 2,857,523 | 10/1958 | Corso | 250—77 |
| 3,018,375 | 1/1962 | Graves et al. | 250—77 |
| 3,291,985 | 12/1966 | Graves et al. | 250—77 |

ARCHIE R. BORCHELT, Primary Examiner

U.S. Cl. X.R.

250—58, 65